US012182797B2

United States Patent
Rule et al.

(10) Patent No.: US 12,182,797 B2
(45) Date of Patent: *Dec. 31, 2024

(54) SYSTEM AND METHOD FOR FACILITATING TRANSACTION ACCOUNT PROVISIONING

(71) Applicant: Capital One Services, LLC, McLean, VA (US)

(72) Inventors: Jeffrey Rule, Chevy Chase, MD (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,523

(22) Filed: Jul. 24, 2023

(65) Prior Publication Data

US 2023/0368182 A1 Nov. 16, 2023

Related U.S. Application Data

(63) Continuation of application No. 17/740,898, filed on May 10, 2022, now Pat. No. 11,887,103.

(51) Int. Cl.
*G06Q 20/40* (2012.01)
*G06Q 20/34* (2012.01)
(Continued)

(52) U.S. Cl.
CPC ......... *G06Q 20/352* (2013.01); *G06Q 20/389* (2013.01); *G06Q 20/4014* (2013.01)

(58) Field of Classification Search
None
See application file for complete search history.

(56) References Cited

U.S. PATENT DOCUMENTS

| 7,146,159 B1 | 12/2006 | Zhu |
| 9,760,871 B1 | 9/2017 | Pourfallah et al. |

(Continued)

FOREIGN PATENT DOCUMENTS

| CA | 2990119 | 6/2018 |
| CN | 107256355 | 10/2017 |

(Continued)

OTHER PUBLICATIONS

Smart Card ID: An Evolving and Viable Technology. https://pdfs.semanticscholar.org/ff61/d9795621e40557fd97e0d33692cde032a4c1.pdf (Year: 2018).

(Continued)

*Primary Examiner* — Bennett M Sigmond
*Assistant Examiner* — Bhavin D Shah
(74) *Attorney, Agent, or Firm* — KDW Firm PLLC; Andrew D. Kasnevich

(57) ABSTRACT

In a method for broadcasting account provisioning information, user datum encryption information is transmitted to a plurality of account processing systems. A request to share account provisioning information is received from a user device associated with an account holder. A user datum of the account holder is encrypted using the encryption information and transmitted to the account processing systems. A response is received from at least one of the account processing systems, the response including an indication that the account holder has a transaction account processed by that account processing system. A request for confirmation that the account provisioning information should be shared is sent to the user device and a confirmation response is received from the user device that includes permission to share account provisioning information. Account provisioning information is then transmitted to one or more of the account processing systems.

20 Claims, 10 Drawing Sheets

(51) Int. Cl.
  *G06Q 20/38* (2012.01)
  *H04L 9/40* (2022.01)

(56) References Cited

U.S. PATENT DOCUMENTS

| | | | |
|---|---|---|---|
| 9,805,370 B1 | 10/2017 | Quigley et al. | |
| 9,836,727 B1 | 12/2017 | Brennen et al. | |
| 10,346,848 B2* | 7/2019 | Ziat | G06Q 20/357 |
| 10,461,933 B2 | 10/2019 | Le Saint et al. | |
| 10,657,531 B1 | 5/2020 | Arumugam | |
| 10,664,824 B2* | 5/2020 | Wong | H04L 9/0869 |
| 10,839,371 B1 | 11/2020 | Vukich et al. | |
| 11,055,683 B1 | 7/2021 | Bartholomew et al. | |
| 11,087,328 B2 | 8/2021 | Carpenter et al. | |
| 11,126,635 B2 | 9/2021 | Behzadi et al. | |
| 11,201,743 B2 | 12/2021 | Le Saint et al. | |
| 11,295,308 B1 | 4/2022 | Fortney et al. | |
| 11,403,630 B2 | 8/2022 | Dua | |
| 11,416,840 B1 | 8/2022 | Wolfe et al. | |
| 2007/0083460 A1 | 4/2007 | Bachenheimer | |
| 2009/0307139 A1 | 12/2009 | Mardikar et al. | |
| 2011/0042464 A1 | 2/2011 | Itay et al. | |
| 2012/0072350 A1 | 3/2012 | Goldthwaite et al. | |
| 2012/0116902 A1 | 5/2012 | Cardina et al. | |
| 2013/0346302 A1 | 12/2013 | Purves et al. | |
| 2014/0019352 A1 | 1/2014 | Shrivastava | |
| 2014/0108263 A1 | 4/2014 | Ortiz et al. | |
| 2014/0114857 A1 | 4/2014 | Griggs et al. | |
| 2014/0164091 A1 | 6/2014 | Hunt | |
| 2015/0095219 A1 | 4/2015 | Hurley | |
| 2015/0186872 A1 | 7/2015 | Sobol et al. | |
| 2015/0254661 A1 | 9/2015 | Lanc | |
| 2015/0324768 A1 | 11/2015 | Filter et al. | |
| 2016/0117650 A1 | 4/2016 | Weidenmiller et al. | |
| 2016/0218875 A1 | 7/2016 | Le Saint et al. | |
| 2016/0342993 A1* | 11/2016 | Morgan | G06Q 30/0633 |
| 2016/0371668 A1 | 12/2016 | Priebatsch et al. | |
| 2017/0353353 A1 | 12/2017 | Nicholas et al. | |
| 2018/0047021 A1* | 2/2018 | Uppalapati | G06Q 20/385 |
| 2018/0181964 A1 | 6/2018 | Zagarese et al. | |
| 2018/0240101 A1 | 8/2018 | Chan | |
| 2018/0276656 A1 | 9/2018 | Goyal et al. | |
| 2018/0336543 A1 | 11/2018 | Van Os et al. | |
| 2019/0122212 A1 | 4/2019 | Huxham et al. | |
| 2019/0213578 A1 | 7/2019 | Reijkens | |
| 2020/0097960 A1 | 3/2020 | Wong et al. | |
| 2020/0366669 A1 | 11/2020 | Gupta et al. | |
| 2021/0150616 A1 | 5/2021 | Kentris et al. | |
| 2021/0174363 A1 | 6/2021 | Locke et al. | |
| 2021/0357938 A1 | 11/2021 | Arumugam | |
| 2021/0398115 A1 | 12/2021 | Newman | |
| 2021/0398205 A1 | 12/2021 | Rule et al. | |
| 2022/0067700 A1 | 3/2022 | Hallaq et al. | |
| 2022/0138725 A1 | 5/2022 | Sneider et al. | |
| 2022/0156355 A1 | 5/2022 | Adcock et al. | |
| 2022/0245606 A1 | 8/2022 | Chauhan et al. | |

FOREIGN PATENT DOCUMENTS

| | | |
|---|---|---|
| CN | 110310113 | 10/2019 |
| EP | 3061056 | 12/2021 |
| GB | 2597581 | 2/2022 |
| WO | 2013/157797 | 10/2013 |
| WO | 2015/126753 | 8/2015 |
| WO | 2015/184114 | 12/2015 |
| WO | 2017/120605 | 7/2017 |
| WO | 2019/094488 | 5/2019 |
| WO | 2020/046906 | 3/2020 |
| WO | 2020/049452 | 3/2020 |
| WO | 2021/135206 | 7/2021 |

OTHER PUBLICATIONS

W. Liu et al., "State of the Art: Secure Mobile Payment," in IEEE Access, vol. 8, pp. 13898-13914, 2020, https://ieeexplore.ieee.org/stamp/stamp.jsp?tp=&amnumber=8947955 (Year: 2020).

Ritcha Ranjan, "Tokenization of a Physical Device or Credit Card for Payment", https://prioart.ip.com/IPCOM/000251283 (Year: 2017).

Igbal et al., ""A Novel Movile Wallet Model for Elderly Using Fingerprint as Authentication Factor"," IEEE, vol. 8, 2022, https://ieeexplore.ieee.org/stamp/stamp.jsp?arnumber=9201279 (Year: 2020).

Joshi, S.: "What is User Provisioning? All You Need to Know in One Place", Jan. 10, 2022, pp. 1-21 (Year: 2022).

Nils: "The Push Provisioning Concept-how to push card to mobile wallets, merchants and wearables" Feb. 18, 2021, pp. 1-6 (Year: 2021).

Mastercard: "MDES Token Connect—Token Requester Implementation Guide and Specifications" Dec. 21, 2021, pp. 1-74 (Year: 2021).

Notification of Transmittal of the International Search Report and the Written Opinion of the International Searching Authority issued in PCT/US2023/021314, mailed Sep. 8, 2023, 13 pages.

* cited by examiner

SYSTEM AND METHOD FOR FACILITATING TRANSACTION ACCOUNT PROVISIONING

CROSS-REFERENCE TO RELATED APPLICATION

The subject application is a continuation of U.S. patent application Ser. No. 17/740,898 filed May 10, 2022, the contents of which is hereby incorporated by reference in their entirety.

FIELD OF THE INVENTION

This disclosure relates generally to systems and automated methods for user account provisioning and, more particularly to an automated system and method for pushing provisioning information to an account processing system.

BACKGROUND OF THE INVENTION

There are many instances where a user having a primary identification card, transaction card, or other primary account wishes to provide data relating to this primary account to administrators/processors of other accounts. Card account holders, for example, often have a number of separate accounts administered by various entities. When a card account holder wishes to provide provisioning information for the holder's card account (or other primary user account) to these entities, the card account holder generally is required to log into the account processing system for each entity and manually enter the card account provisioning information.

In some instances, the card account holder may be required to interrupt a session or process in order to provide account or personal information that is already stored by one or more card account (or other primary account) administrator entities. Some card account applications may facilitate provisioning by giving their card holders the option of stepping through a list of account processing entities and identifying those that the card holder wishes to have provisioned with card account information. This approach, however, requires operation within the card holder application and limits the user to the account information held by the administrator of that application.

SUMMARY OF THE INVENTION

An illustrative aspect of the invention provides 1. A method for providing provisioning information to a transaction account processing system. The method comprises a set of actions, all carried out by an administrator data processing system, the actions including, for each of a plurality of user accounts, using user datum encryption information to encrypt a common user datum of an account holder associated with the user account. The actions by the administrator data processing system further include storing each encrypted common user datum in an account holder record with an account identifier and account holder information for the associated account holder, receiving from a transaction account processing system over a network a user account query including an encrypted client datum associated with a client user of the transaction account processing system, and comparing the encrypted client datum with each encrypted common user datum to determine if the client user is an account holder of an account administrator associated with the administrator data processor. Responsive to a determination that the client user is an account holder, the administrator data processing system transmits to the transaction account processing system, a query response including a positive account holder identification notification. The actions of the administrator data processing system further include receiving a transition response notification from the transaction account processing system, constructing an application transition link configured to launch, on a user device of the client user, an account application associated with the user account of the account holder, and transmitting, to the user device, a transaction processing prompt including the application transition link. The actions also include receiving a transaction processing response from the user device via the account application, the response including an account information provisioning approval from the client user, and transmitting, to the transaction account processing system, account provisioning information including at least a portion of the account holder information.

Another aspect of the invention provides an automated system for providing provisioning information to an account processing system. The system comprises a datum encryption data processor, a user account identification data processor, a session transition data processor, and an account provisioning data processor. The datum encryption data processor is configured to receive, from an encryption information generator, user datum encryption information. The datum encryption data processor is further configured to, for each of a plurality of user accounts, encrypt a common user datum of an account holder associated with the user account and store each encrypted common user datum in an account holder record with an account identifier and account holder information for the associated account holder. The user account identification data processor is configured to receive, from the account processing system, a user account query including an encrypted client datum, which is associated with a client user of the account processing system. The user account identification data processor is further configured to compare the encrypted client datum with each encrypted client datum to determine if the client user is an account holder and to transmit an account query response to the account processing system. The session transition data processor is configured to receive a transition response notification from the transaction account processing system and construct an application transition link configured to launch, on a user device of the client user, an account application associated with the user account of the client user. the session transition data processor is also configured to transmit a session transition prompt to the user device. The session transition prompt includes the application transition link. The account provisioning data processor is configured to receive a provisioning confirmation response from the client user via the account application on the user device and transmit, to the account processing system, account provisioning information including at least a portion of the account holder information.

Another aspect of the invention provides a non-transitory, computer readable medium comprising instructions that, when executed on a data processing system, perform actions comprising, for each of a plurality of user accounts, encrypting a common user datum of an account holder associated with the user account and storing each encrypted common user datum in an account holder record with an account identifier and account holder information for the associated account holder. The instructions further include receiving, from a transaction account processing system over a network, a user account query including an encrypted client datum associated with a client user of the transaction account processing system and comparing the encrypted client datum with each encrypted client datum to determine if the client user is an account holder. The instructions further include, responsive to a determination that the client user is an account holder, transmitting, to the transaction account processing system, a query response including a positive account holder identification notification. the instructions also include receiving, from the transaction account processing system, a transition response notification and constructing an application transition link configured to launch, on a user device of the client user, an account application associated with the user account of the account holder. The instructions still further include transmitting, to the user device, a transaction processing prompt including the application transition link and receiving a transaction processing response from the user device via the account application. The response includes an account information provisioning approval from the client user. The instructions also include transmitting, to the transaction account processing system, account provisioning information including at least a portion of the account holder information. In some cases, the instructions may also include transmitting a confirmation authentication request to the user device, receiving, at least one authentication credential from the user device, and authenticating the transaction processing response using the at least one authentication credential and a predetermined authentication process. In such cases, the action of transmitting account provisioning information may be carried out only after a positive authentication of the confirmation response.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides methods by which a user device in communication with a transaction administrator can select a card or other primary account administrator (e.g., a bank or transaction card account administrator) with which the user has an account and seamlessly launch an application of the selected primary administrator through which the user can request or approve an action by that primary account administrator to securely push account provisioning information to the transaction administrator. This is accomplished, in part, through the use of a shared encryption/hashing algorithm that allows partner primary account administrators and transaction processing entities to identify account holders they have in common and establish the basis for secure transmission of primary account provisioning information to a partner transaction administrator.

The present invention is usable for any type of account, but is of particular value for those associated with a smart card (e.g., a chip-provided identification card or transaction card). While not limited to such accounts, the invention may be of particular value in relation to card-based financial accounts. As used herein, the term financial account encompasses any account through which financial transactions may be processed. Financial accounts can include, for example, credit accounts, savings accounts, checking accounts, investment accounts, and the like.

Figure 1:
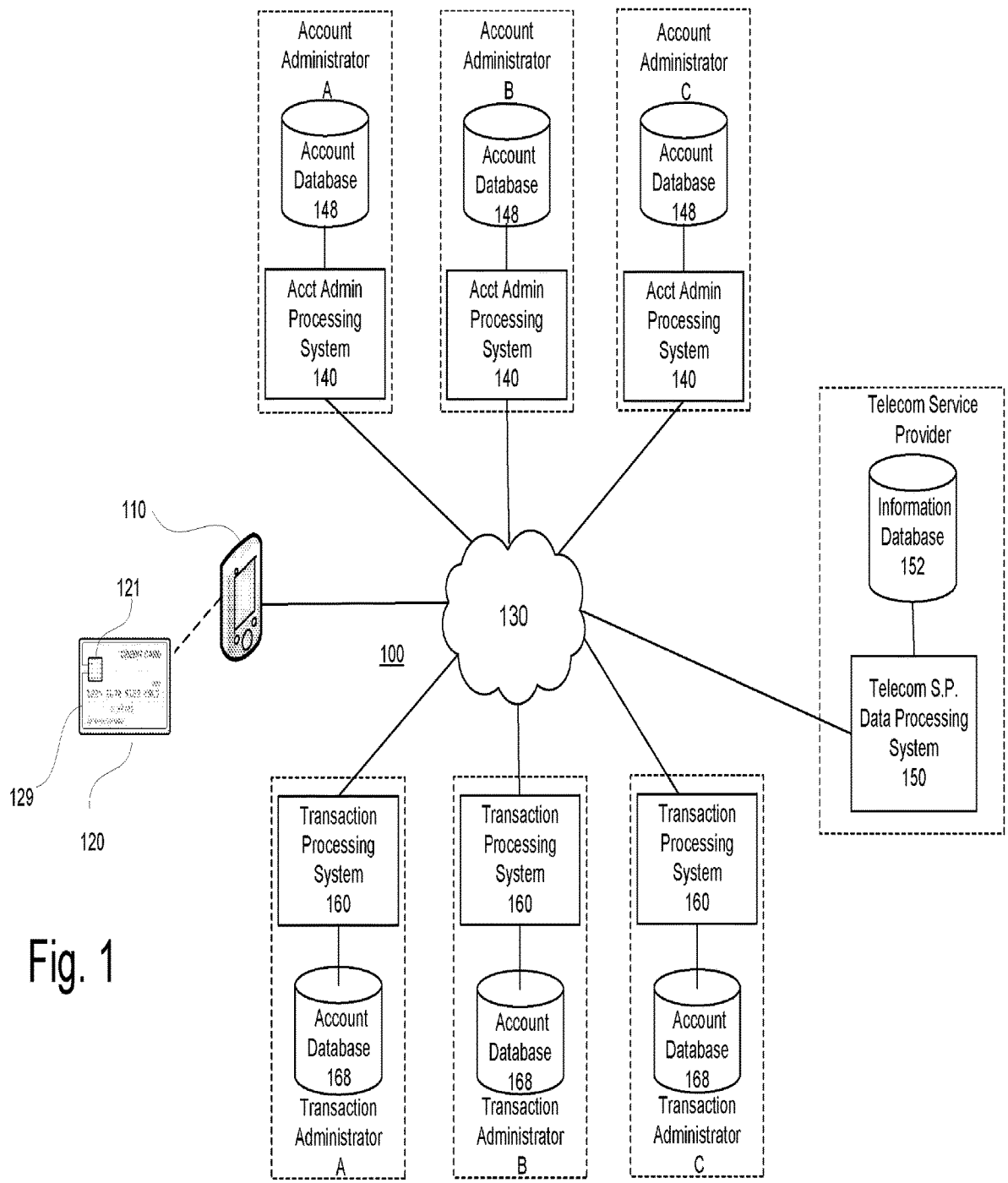
FIG. 1 is a schematic representation of an account transaction system usable in conjunction with embodiments of the invention.

Embodiments of the invention may be best understood with reference to FIG. 1, which illustrates an exemplary account transaction system 100 that encompasses a user device 110, a plurality of primary account administrators, each having an account administrator data processing system 140 and an account holder database 148, and a plurality of transaction administrator entities A, B, C, each having a transaction account processing system 160 and an account information database 168. It will be understood that the system 100 may include any number of user devices 110, account administrators, and transaction administrators. As will be discussed, the system 100 may also include one or more telecom service providers. In the illustrated example, the user device 110, the account processing systems 160, and the administrator data processing systems 140 are network-enable computer systems configured to communicate with each other via a communication network 130.

As referred to herein, a network-enabled computer system and/or device may include, but is not limited to any computer device, or communications device (or combination of such devices) including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the transactions contemplated in the embodiments may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

The network 130 may be any form of communication network capable of enabling communication between the transaction entities and the card processing system 100. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 130 is depicted as a single network, it will be appreciated that it may comprise a plurality of interconnected networks, such as, for example, the Internet, a service provider's network, a cable television network, corporate networks, and home networks.

In the example embodiments presented herein, an account holder may be any individual or entity having a primary account with one or more account administrators (e.g., banks or other primary card account processors) and, typically, one or more secondary accounts with transaction account processing entities (e.g., merchants or other service providers). An account holder user device 110 may be a mobile device or other processor that an account holder uses to carry out a transaction. An account may be held by any place, location, object, entity, or other mechanism for performing transactions in any form, including, without limitation, electronic form. An account may be a financial account or a non-financial transaction account. In various embodiments, a card-facilitated account may be a credit card account, a prepaid card account, stored value card account, debit card account, check card account, payroll card account, gift card account, prepaid credit card account, charge card account, checking account, rewards account, line of credit account, credit account, mobile device account, or mobile commerce account. In some instances, the account holder may be a transaction processing entity such as a financial institution, credit card provider, or other entity that offers accounts to customers.

Figure 2:
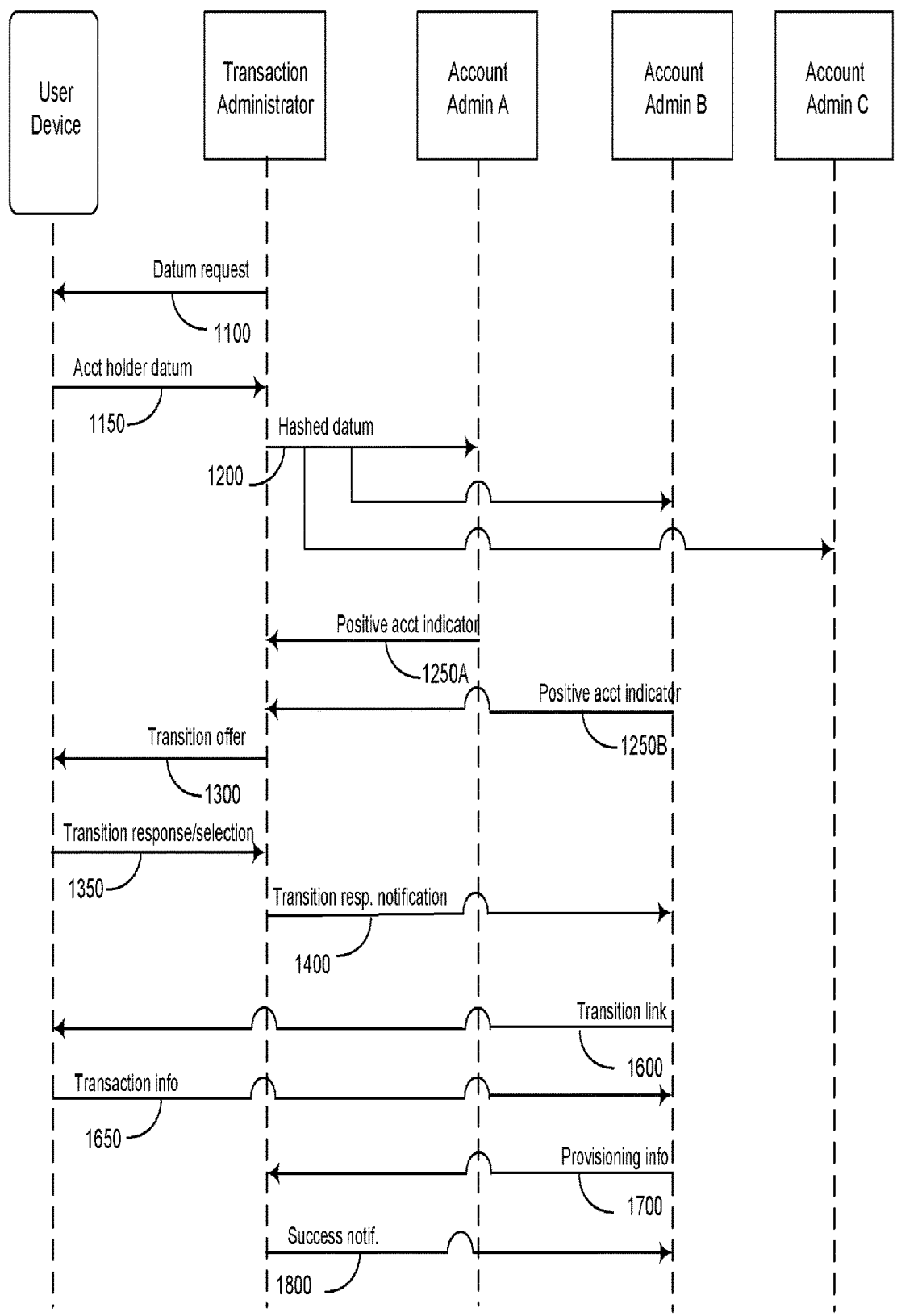
FIG. 2 illustrates a sequence of operations for automatically providing account provisioning information to a transaction administrator system according to an embodiment of the invention.

The sequence diagram of FIG. 2 illustrates an exemplary application of embodiments of the invention in conjunction with the system 100 of FIG. 1. In the scenario set forth in FIG. 2, an account holder associated with a user device is in communication with a transaction administrator (e.g., as part of a digital transaction). The transaction administrator may be any one of Transaction Administrators A, B, C and the communication may be in any form such as via point-of-sale device, website or through a transaction application on the user device. The account holder has a primary account with each of Account Administrator A and Account Administrator B. In this scenario, the transaction administrator requires account information from the account holder and the account holder wishes to provision the account processing system of the transaction administrator with information associated with one of the primary accounts. Embodiments of the present invention provide an automated process by which the account administrators having accounts for the account holder can be identified by the transaction administrator, the account holder can select a particular primary account administrator, and that administrator can then transmit provisioning information to the transaction administrator. To accomplish this and prior to the events shown in FIG. 2, the partner Account Administrators A, B, C and the Transaction Administrators A, B, C, share encryption information with one another that can be used to encrypt a predetermined piece of account holder information that is unique to the account holder and would typically be available to all of the administrators. This piece of account holder information (sometimes referred to herein as an account holder datum or user datum) may be. for example, a telephone number, email address, driver's license number, social security number, or employee number. The encryption information may be, for example, a unique algorithm and/or encryption key values usable to create a hash of a standardized format version of the account holder datum. The encryption information may be generated by any one of the partner entities or by a third party and is configured so that the hashing result cannot be reversed to determine the account holder datum. At the time the encryption information is provided to the partner administrators, the partners may also agree on the particular account holder datum to be used and the format it should be in prior to hashing. Once received, the encryption information can be used by each partner administrator to create and store a hash of the common account holder datum for each of its account holders.

The scenario of FIG. 2 assumes that the partner administrators have all received the account holder datum encryption information. The sequence of FIG. 2 begins at 1100 when, as part of the communication between the user device and the Transaction Administrator, the Transaction Administrator requests information from the account holder. This requested information may include, in particular, the standard account holder datum. The account holder provides this information to the Transaction Administrator via the user device at 1150. In response, the Transaction Administrator uses the encryption information to encrypt the account holder datum and, at 1200, transmits it to all of the partner primary Account Administrators A, B, C. Each of the Account Administrators may then compare the hashed datum to each hashed account holder datum in its account database 148 to determine if the account holder has an account with that Administrator. In the scenario illustrated in FIG. 2, Account Administrators A and B each find that they have a matching hashed datum and, thus, have an account for the account holder. Accordingly, at 1250A and 1250B, Account Administrators A and B transmit a response to the Transaction Administrator that includes a positive account indicator. Transaction Administrator C fails to find a matching hashed datum, and thus, does not transmit a response. It will be understood that, in some embodiments, Transaction Administrator C could still send a response, but with a negative account indicator.

The hashed user datum approach described above allows the Transaction Administrator and the primary Account Administrators to determine if they have a particular account holder in common without having to share any account holder information. Thus, no usable account holder information is shared with transaction administrators who do not have an account with the account holder.

Having received positive account indicators from at least some of its partners, the Transaction Administrator, at 1300 of the exemplary sequence of FIG. 2, transmits a transition offer to the account holder's user device. The transition offer includes identification of Account Administrators A and B and asks the account holder via the user device if the account holder would like to transition the communication to an application specific to one of the two Account Administrators with whom the account holder has an account. At 1350, the user device transmits a response to the offer. This may include a positive response to the offer and a selection of one of the responding account administrators. In the scenario of FIG. 2, the response indicates that the account holder wishes to transition the communication to an application of Account Administrator B. At 1400, the Transaction Administrator transmits a transition response notification to Account Administrator B. No information on the account holder other than the hashed account holder datum need be included with the notification. The notification may, however, include information on a transaction in progress between the Transaction Administrator and the account holder. Account Administrator B may use the hashed datum to identify the account holder and retrieve information from its database 148 for a user device associated with the account holder. In the scenario of FIG. 2 this user device is the same device as that used in the communication between the account holder and the Transaction Administrator, but this need not be the case. At 1600, Account Administrator B transmits a transition link to the user device. In some embodiments, the link may be sent to the Transaction Administrator, which would relay it to the user device for display to the account holder. The transition link is configured so that, when triggered by the account holder, it launches an application specific to Account Administrator B. It may also include information specific to a transaction in progress. At 1650, the user device transmits a transaction information message to Account Administrator B via the application. This transaction information may include an instruction to provide provisioning information to the Transaction Administrator. It may also include additional information about a transaction in progress and/or information or instructions needed to complete the transaction. In some embodiments, the transaction information message may also include user authentication information. This may be or include any suitable information usable by the account administrator to confirm that the user of the user device is the account holder and/or is authorized to make the provisioning request. In some embodiments, the transaction information may include information encrypted by the microprocessor 121 of a smart card and communicated to the user device 110 via near field communication (NFC).

At 1700, Account Administrator B assembles the provisioning information and transmits it to the Transaction Administrator. As suggested above, this action may be conditioned on verification of authentication information provided in or with the transaction information. The actual provisioning information may be any information associated with the account holder or the account that would be usable by the transaction administrator to draw an association between the account holder and the primary account administered by Account Administrator B. In many cases, the provisioning information may include a card identifier that can be used to facilitate a transaction and associate it with the account holder. At 1800, the Transaction Administrator transmits a notification to Account Administrator B indicating that the account provisioning was successfully completed. This may be accomplished, for example, through an API call back.

In some instances, an account administrator may not want to forward provisioning information for an account because of certain conditions or because of changes that have been made to the account. For example, higher rates of fraud may be associated with transactions involving an account for which an associated user device has recently had its identifier changed (e.g., a phone number change) and/or a hardware alteration (e.g., a sim card change). In such cases, the account administrator may require that a certain amount of time pass before the account may be used or before account information may be provided to partner administrative entities.

Figure 3:
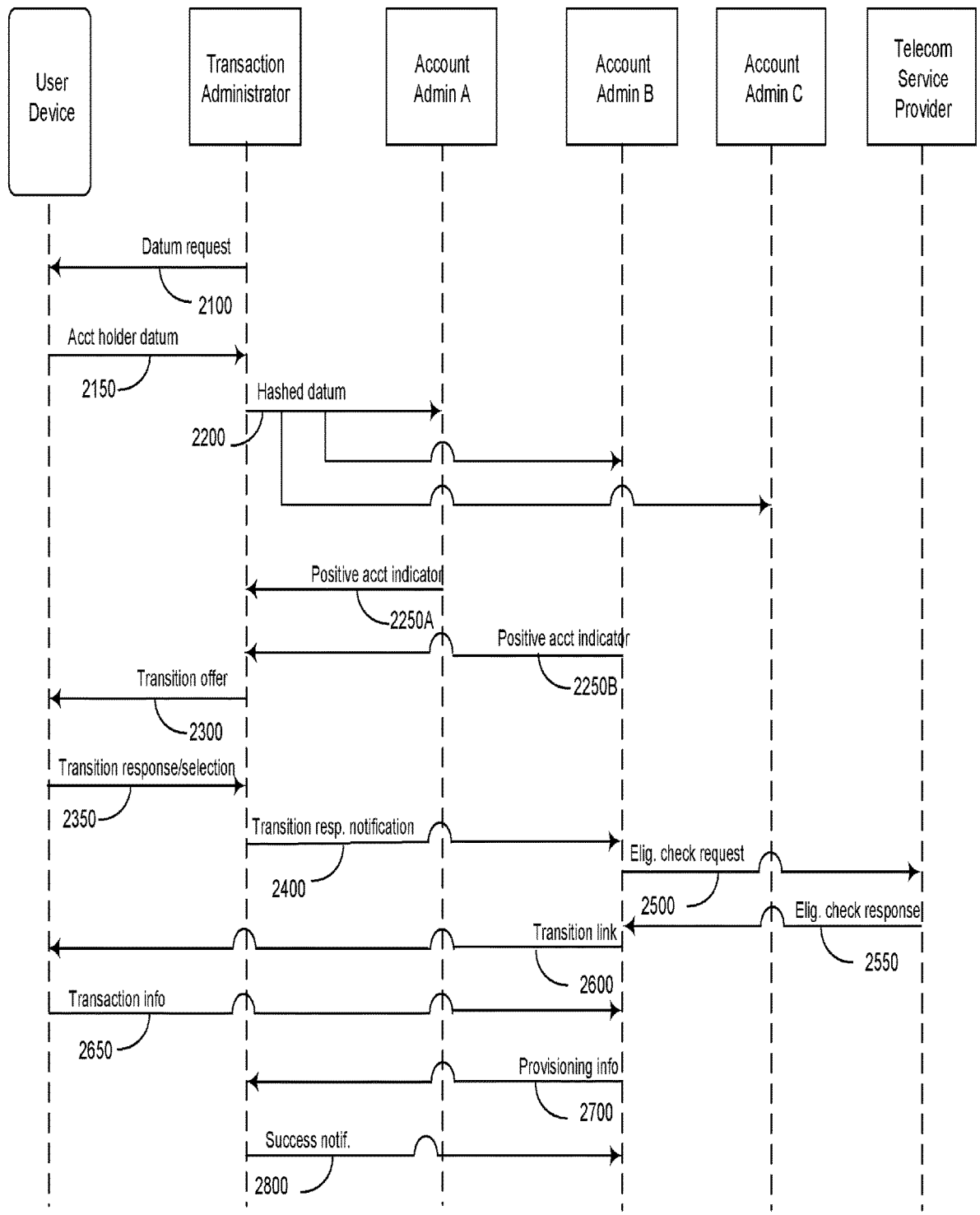
FIG. 3 illustrates a sequence of operations for automatically providing account provisioning information to a transaction administrator system according to an embodiment of the invention.

The sequence diagram of FIG. 3 illustrates an exemplary scenario in which the primary account administrator runs eligibility checks using the information in the stored record for the account holder. At 2100, as part of the communication between the user device and the Transaction Administrator, the Transaction Administrator requests information from the account holder. This requested information may include, in particular, the standard account holder datum. The account holder provides this information to the Transaction Administrator via the user device at 2150. In response, the Transaction Administrator uses the encryption information to encrypt the account holder datum and, at 2200, transmits it to all of the partner primary Account Administrators A, B, C. As in the previous scenario, Account Administrators A and B each find that they have a matching hashed datum and, thus, at 2250A and 2250B, transmit a positive response to the Transaction Administrator. Transaction Administrator C fails to find a matching hashed datum, and thus, does not transmit a response.

As before, the Transaction Administrator transmits a transition offer at 2300 the user device transmits a response to the offer at 2350. At 2400, the Transaction Administrator transmits a transition response notification to Account Administrator B.

Account Administrator B may use the hashed datum to identify the account holder and retrieve information from its database 148 for a user device associated with the account holder. At this point, in the scenario of FIG. 3, Account Administrator B runs one or more eligibility checks to determine if provisioning information should be provided to the Transaction Administrator. This could include, for example a determination as to whether particular information in the account holder records (e.g., phone number or address) has changed within the last thirty days. It may also include a determination as to whether changes have been made to the user device 110. This, however, may require information from an external source such as a telecom service provider associated with the user device 110. The service provider could be, for example, a mobile network operator (MNO) if the user devices is a mobile phone. For other user devices, the service provider could be an internet service provider (ISP). Accordingly, at 2500, the data processing system 140 of Account Administrator B may transmit a request for eligibility check information to the data processing system 150 of a telecom service provider. At 2550, the telecom service provider returns a response with information that the Account Administrator can compare to its eligibility criteria. If, for example, the service provider response indicates no changes associated with the user device within the previous year, the Account Administrator may deem that portion of the criteria to have been met.

In the scenario of FIG. 3, Account Administrator B determines that the eligibility criteria are met and, in response, constructs and transmits a transition link at 2600. In some embodiments, the link may be sent to the Transaction Administrator, which would relay it to the user device for display to the account holder. The transition link is configured so that, when triggered by the account holder, it launches an application specific to Account Administrator B. The sequence then proceeds as before. At 2650, the user device transmits a transaction message to Account Administrator B via the application. At 2700, Account Administrator B assembles the provisioning information and transmits it to the Transaction Administrator. This may be conditioned on validation of authentication information provided by the user device. At 2800, the Transaction Administrator transmits a notification to Account Administrator B indicating that the account provisioning was successfully completed.

Details of system components usable in embodiments of the invention and, in particular, the system 100 will now be described.

Figure 4:
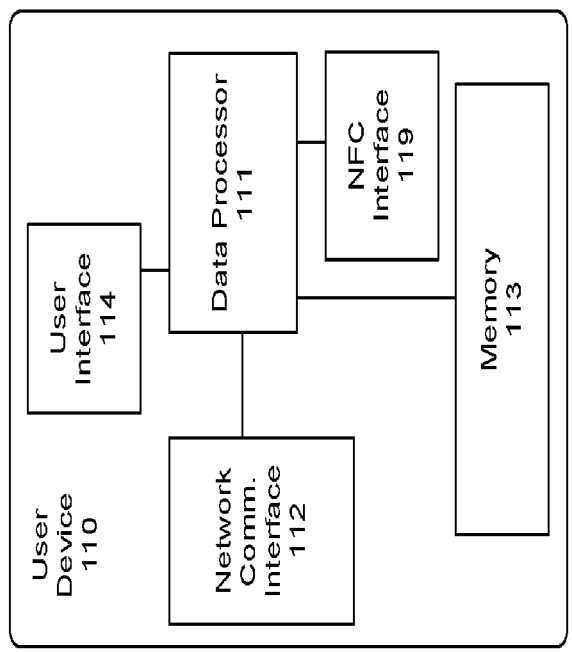
FIG. 4 is a schematic representation of a user processing device usable in embodiments of the invention.

With reference to FIG. 4, the account holder user device 110 may be any computer device or communications device including a server, a network appliance, a personal computer (PC), a workstation, and a mobile interface device such as a smart phone, smart pad, handheld PC, or personal digital assistant (PDA). In a particular embodiment illustrated in FIG. 4, the user device 110 includes an on-board data processor 111 in communication with a memory module 113, a user interface 114, and a network communication interface 112. The data processor 111 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 114 of the device 110 includes a user input mechanism, which can be any device for entering information and instructions into the user device 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays.

The network communication interface 112 is configured to establish and support wired and/or wireless data communication capability for connecting the device 110 to the network 130 or other communication network. The network communication interface 112 can also be configured to support communication with a short-range wireless communication interface, such as Bluetooth.

In some embodiments, the user device 110 may include an NFC interface 119 configured for establishing NFC communication with other NFC-equipped devices. In some of these embodiments, the NFC interface 119 may be or include an NFC receiver configured for selectively activating a magnetic field for use in establishing near field communication with an NFC transmitter. The NFC interface 119 is configured for establishing NFC communication when a passive NFC tag or other NFC-enabled device is brought into the magnetic field and within NFC communication range of the user device 110. The NFC interface 119 is configured, in particular, for communication with an NFC-enabled smart transaction card 120 when the card 120 is brought within communication range of the user device 110.

In embodiments of the invention, the memory 113 may have stored therein one or more applications usable by the data processor 111 to conduct and/or monitor transactions between the user device 110 and transaction processing devices or systems over the network 130. These applications may include instructions usable by the data processor 111 to identify transaction events, store event data in the memory 113, and communicate event data to a transaction information processing system, the administrator data processing system 140, and/or one or more of the account processing systems 160. In particular embodiments, a transaction application may include instructions for communicating with a transaction administrator data processing system 160 as part of a transaction session. Such a session may be carried out via the network 130 or by short range communication with a transaction processing machine in communication with the transaction administrator data processing system 160. The transaction application may include instructions for the data processor 111 to receive a datum request from the transaction administrator data processing system 160, to receive, from the user via the user interface 114, the requested user datum, and to transmit the user datum to the transaction data processing system 160. The instructions may also include instructions to receive and display a transition offer message from the transaction administrator data processor. This may include displaying a list of primary account administrators with whom the user has an account and an offer to transition a transaction session to an application of one of the account administrators. The application may instruct the data processor 111 to receive an offer response and, if applicable, a selection of one of the primary account administrators from the user via the user interface 114. The application may then cause the user device 110 to transmit the offer response to the transaction processing system 160. The application may then alert the user to expect a communication from the selected account administrator entity that includes a transition link that will cause the administrator entity's application to be launched on the user device 110 and the transaction session to transition to that application.

In particular embodiments, the memory 113 may include one or more account applications each associated with an account administered by a primary account administrator. Some or all of these accounts may be transaction card accounts associated with an account holder user of the user device 110. Each account application may be configured for carrying out interactive communications/transactions with the administrator data processing system 140 of a particular administrator entity and, in some embodiments, one or more transaction account processing systems 160. The account application may be launched by the user from a home or desktop screen or by activating a link received in a communication (e.g., an SMS communication) or in an interactive web session. The application may be configured for receiving, from the account holder via the user interface 114 upon launch, login information for establishing authenticatable communication with the administrator data processing system 140. The login information may include an account identifier or other user identification and user authentication information.

Among other functions, the account applications may include instructions for implementing a provisioning function, the result of which is the pushing of account provisioning information to a transaction processing system 160 for use in completing a transaction. These instructions may be initiated as the result of activation of the above-described transition link receives from the administrator data processing system 140 of the previously selected account administrator. When selected, the application transition link launches the account application associated with the selected account administrator. The account application includes instructions for the user device 110 to receive transaction information from the user via the user interface 114 and to interpret transaction information received with or in the transition link. The transaction information received from the user may include a confirmation that the user wishes the account administrator to send transaction provisioning information to the transaction administrator data processing system 160. It may also include information usable by the primary account administrator to authenticate the response and/or authorization of the user. Authentication information may include an account identifier or other user identification and user authentication information. The user authentication information may include at least one authentication credential such as a password or a scanned biometric characteristic. In some embodiments, an authentication credential may be or include information encrypted using an encryption key associated with the account and the account holder or the user device 110.

In some embodiments in which the user's account with the primary account administrator is a smart transaction card account, the user may be required to establish communication (e.g., near field communication) between the user device and the smart transaction card. In such embodiments, the application may include instructions for the user device 110 to establish communication with the processor of the transaction card and to receive information (e.g., card-encrypted information) from the transaction card, which can be included in the transaction information for use by the account administrator data processor for authentication, The application may further include an instruction for the user device 110 to transmit the transaction information to the administrator data processor 140 via the network communication interface 112 and the network 130.

The user device application may be further configured to instruct the data processor 111 to construct a confirmation response including confirmation and/or authentication/verification information and to transmit the response to the administrator data processing system 140 via the network communication interface 112 and the network 130. The application may also be configured to receive and display a provisioning completion message from the administrator data processor 140.

The transaction card 120 may be any chip-carrying transaction card ("smart" card) having electrical and/or near field or other short range communication capabilities. A typical transaction card 120 that is usable in various embodiments of the invention is a smart card with a microprocessor chip 121. The microprocessor chip 121 includes processing circuitry for storing and processing information, including a microprocessor and a memory. It will be understood that the processing circuitry may contain additional components, including processors, memories, error and parity/CRC checkers, data encoders, anticollision algorithms, controllers, command decoders, security primitives and tamper-proofing hardware, as necessary to perform the functions described herein.

The transaction card 120 may be configured for communication with transaction terminals and other devices via a communication interface configured for establishing communication with transaction processing devices. The communication interface may be configured for contact-based communication, in which case the interface may have electrical circuitry and contact pads on the surface of the card 120 for establishing direct electrical communication between the microprocessor and the processing circuitry of a transaction terminal. Alternatively or in addition, the communication interface may be configured for contactless communication with a transaction terminal or other wireless device. In such embodiments, the communication interface may be or include an NFC communication interface configured for communication with other NFC communication devices when the card 120 is within a predetermined NFC range. The communication interface and the microprocessor may, in particular, be configured for establishing NFC communication with the user device 110. In some embodiments, the microprocessor chip 121 may include a second communication interface configured for establishing short range communication with the user device 110 via Bluetooth, or other short range communication methodology. In such embodiments, the transaction card 120 may have a short range communication antenna 129 that is included in or connected to the short range communication interface. The microprocessor chip 121 may also include a power management system for use in managing the distribution of power during an NFC transaction.

The memory may be a read-only memory, write-once read-multiple memory or read/write memory, e.g., RAM, ROM, and EEPROM, and the chip 121 may include one or more of these memories. The memory may have stored therein information associated with a transaction card account. In some embodiments, the memory may have permanently stored therein a unique alphanumeric identifier associated with the account. It may also have stored public and private card encryption keys. In some embodiments, the private and public encryption keys may be permanently hard-wired into the card memory.

The card memory may be configured to store one or more software applications for execution by the microprocessor. In various embodiments, the memory may have stored therein instructions for generating encrypted information and transmitting it to a receiving device (e.g., the user device 110). Such encrypted information may be or include an encrypted verification block or signature that may be used to authenticate and verify the presence of the transaction card 120 during transaction processing. In some embodiments, encrypted information be unique to a particular communication (e.g., a particular NFC transmission by the transaction card).

Figure 5:
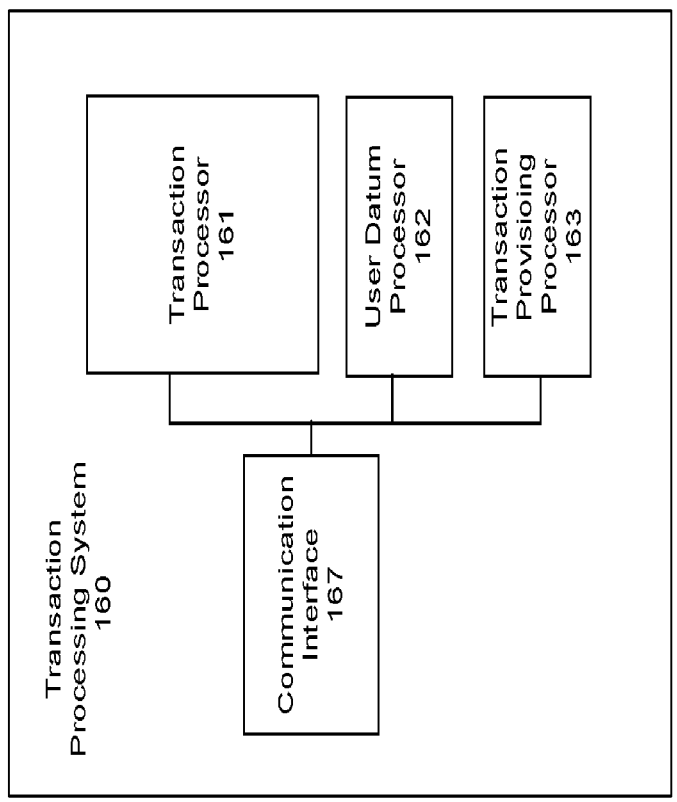
FIG. 5 is a schematic representation of a transaction administrator data processing system according to an embodiment of the invention.

The transaction administrator account processing systems 160 are network-enabled data processing systems that are each configured for management and control of account-related transactions for a plurality of user accounts. With reference to FIG. 5, each transaction account processing system 160 may include a network communication interface 167 configured for communication over the network 130 and/or other networks. The network communication interface 167 may be configured, in particular, to facilitate communication with one or more user devices 110 via the network 130 for establishing interactive communication sessions with account holders. The communication interface 167 may also be configured for selective communication with other entities via the network including the account administrator data processing systems 140.

The processing system 160 may include a transaction processor 161 configured for processing transactions between the account holder and the transaction administrator. Such transactions may be accomplished via interactive web communication sessions, user device applications, or through a transaction processing machine at an on-site location. In particular embodiments where the transaction administrator is or is affiliated with a merchant, such transactions may be purchase or other financial transactions. In some embodiments, the transaction processor 161 may be configured for carrying out transactions that require additional account or account holder information. In such embodiments, the transaction processor 161 may be configured to request and receive manually entered information from the account holder. The transaction processor 161 may, however, be configured to give the account holder an option to obtain account information from a card account or other primary account administrator. As part of this option, the transaction processor 161 may request and/or receive a particular user datum that can be used to identify partner account administrators with whom the account holder has an account. The user datum may be a typical piece of account holder information that is unique to the account holder and would typically be known or available to any account administrator with whom the account holder may have an account. The account holder datum could be. for example, a telephone number, email address, driver's license number, or employee number.

The processing system 160 may include a user datum processor 162 configured to receive hashing information from a third party encryption generating entity or from any other of the transaction administrator data processing systems or administrator data processing systems 140. The hashing information may be, for example, a unique algorithm and/or values usable to create a hash of a standardized format version of the user datum. The user datum processor 162 may be further configured to put the received user datum into the standard format and encrypt it using the hashing information. The user datum processor 162 may then transmit a user account query including the hashed user datum over the network 130 (or a different network) to the administrator processing systems 140 of one or more partner account administrators to which the hashing information has also been provided. The user datum processor 162 may also be configured to receive, over the same network, responses from any or all of the partner administrator processing systems 140. In some embodiments, each response may include an indication that the account administrator associated with the responding processing system 140 has or does not have its own account for the account holder. In other embodiments, responses are only received from administrator processing systems 140 associated with account administrators that have accounts with the account holder. The user datum processor 162 may be configured to determine from the query responses a subset of the partner account administrator processing systems 140 that have accounts for the account holder.

The transaction processing system 160 may also include a transaction provisioning processor 163 that is configured for transmitting a transition offer message to the user device 110. The offer message may include a listing of the subset of partner account administrators that can be displayed to the account holder by the user device 110. The offer message may ask the account holder if the account holder wishes to transition to an application of one of the primary account administrators. The transaction provisioning processor 163 may be configured to receive a response indicating a particular administrator/application to which the account holder would like to transition. The transaction provisioning processor 163 may then transmit a transition response notification to the administrator data processing system 140 of the identified administrator entity. The transition response notification may include identification of the account holder (e.g., using the previous encrypted user datum or through unencrypted account holder information) and indicate that the account holder wishes to complete a transaction using an application associated with the identified administrator entity. The transition response notification may also include information on the transaction to be completed. If the transaction is a financial transaction, this could include, for example, an amount of a purchase to be processed using the account holder's account with the identified entity.

The provisioning processor 163 may also be configured to receive transaction provisioning information from the selected administrator data processing system 140 and to transmit back to the administrator data processing system a notification that the provisioning information was received.

In particular embodiments, some or all of the transaction administrators may be merchants whose transaction processing systems 160 are configured to carry out merchant transactions. In such embodiments, the transaction provisioning information may include account information for an account administered by the primary account administrator from whom the provisioning information is received. In some of these embodiments, the user account administered by the account administrator is a contactless transaction card account, and the account provisioning information includes contactless card account information for use in carrying out merchant account holder transactions processed by the account processing systems 160.

In some embodiments where the user has an account with the transaction administrator, some or all of the transaction provisioning information may be stored by the provisioning processor 163 in an account database 168 in association with account information for the user/account holder. The account information in the account database 168 may include information on the account holder as well as information on accounts with other administrators. Account holder information may include contact information (mailing address, email address, phone numbers, etc.) and user preferences. It may also include information for a primary account (e.g., a bank or other cardholder administrator) for use in certain transactions related to the account with that administrator entity.

It will be understood that while the transaction processor 161, user datum processor 162, and transaction provisioning processor 163 are depicted as individual systems, the functions of these system may be carried out by a single data processing system or further divided among additional data processing systems.

Figure 6:
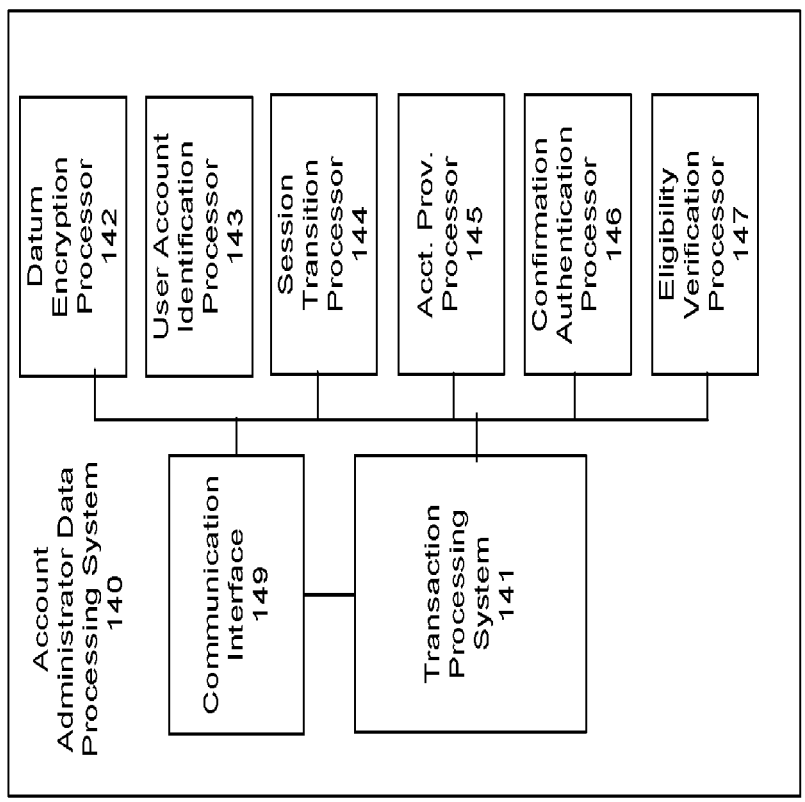
FIG. 6 is a schematic representation of an account administrator data processing system according to an embodiment of the invention.

With reference to FIG. 6, the administrator data processing systems 140 may include a communication interface 149 configured for establishing communication with one or more networks including the network 130, and, via the one or more networks, the user device 110, other administrator data processing systems 140, one or more telecom service provider data processing systems 150, and one or more transaction administrator account processing systems 160. The administrator data processing system 140 includes a transaction processing system 141 configured to communicate with a plurality of user devises 110 and with other transaction processing systems over the network 130 via the network interface 149. The transaction processing system 141 may be configured for receiving and processing account and transaction information. In particular embodiments, this may include, for example, processing financial transactions related to financial transaction card accounts (which could include, e.g., an account associated with transaction card 120).

The administrator data processing systems 140 may each further include a datum encryption processor 142, a user account identification processor 143, a session transition processor 144, and a provisioning information broadcast processor 145. In some embodiments, the system 140 may also include a confirmation authentication processor 146 and/or an eligibility verification processor 147. Any or all of these processors may be configured to communicate over the network 130 via the communication interface 149.

The datum encryption data processor 142 may be configured to receive the same hashing information provided to the transaction administrator processing system 160 for use in encrypting a user datum. Again, the encryption information may be received from a third party encryption generating entity or from any other of the transaction administrator data processing systems or administrator data processing systems 140. The user datum processor 162 may be further configured to use the encryption information to encrypt a standard, formatted account holder datum for each account holder of the account administrator associated with that account administration processing system. The particular account holder datum and the format of the datum for encryption may be as agreed upon by some or all of the partner administrators including, in particular, the querying transaction administrator. The hashed datum for each account holder may then be stored with other account holder information in an account database storage unit 148.

The user account identification processor 143 may be configured to receive a user account query from any of the partner transaction data processing systems 160 via the network 130. The user account query may include an encrypted transaction user datum, which the account identification processor 143 can compare to the stored datum for each of its account holders. Upon finding a hashed account holder datum that matches the hashed card holder datum, the account identification processor 143 may transmit to the querying transaction data processing system 160 a positive query response indicating that the associated administrator has an account for the user associated with the encrypted user datum.

The session transition processor 144 may be configured to receive a transition notification response from the partner transaction data processing system 160. The transition response notification may include identification of the account holder (e.g., using the previous encrypted user datum or through unencrypted account holder information) and indicate that the account holder wishes to complete a transaction using an application with the account administrator. The transition response notification may also include information on the transaction to be completed. If the transaction is a financial transaction, this could include, for example, an amount of a purchase to be processed using the account holder's account with the account administrator.

The session transition processor 144 is further configured to use the account holder identification information to retrieve further account holder information from the account holder database 148. This information may include, in particular, contact information for the user device 110 (or other user device) of the account holder. The session transition processor 144 may then prepare and transmit a transition link message to the user device 110 via the network 130 or other telecommunications network. In particular embodiments, the message may be sent via SMS or SMS OTP. In some embodiments, the link transition message may be sent to the transaction data processing system 160, which would relay it to the user device 110 for display to the account holder. The transition link message may include a transition link constructed by the session transition processor 144. The transition link is configured so that, when triggered by the account holder, it launches an account application installed on the user device 110, the account application being associated with the account administrator. If the desired account application is not installed on the user device 110, the link may operate to connect the device to a location where the application may be downloaded to the user device 110. In some embodiments, the transition link may be constructed to include information on the transaction received from the transaction data processing system 160. Some or all of this information may be displayed to the user or otherwise used by the account application.

As discussed above, the user device-launched application may include a transaction provisioning function that prompts the user of the user device 110 to confirm that the user wishes to proceed with the current transaction using the account administrator transaction application and to transmit a transition link response back to the account administrator data processing system 140. The account provisioning data processor 145 is configured to receive the transition link response from the user device 110 and, responsive to a positive confirmation that provisioning is to proceed, assemble the requested account holder provisioning information and transmit the information to the transaction administrator data processing system 160 for use in completing the transaction. In particular embodiments where the account administrator is a financial institution and the account is a transaction card account, the provisioning information may include a card or card account identifier that can be used to complete the transaction.

As noted above, the administrator data processing system 140 may also include a confirmation authentication processor 146. The confirmation authentication processor 146 may be a separate processor as illustrated in FIG. 6. Alternatively, the functions of the confirmation authentication processor 146 may be combined with those of the account provisioning data processor 145. The confirmation authentication data processor 146 may be configured to transmit a confirmation authentication request to the user device 110 over the first network. In some embodiments, this request may be combined with the confirmation request. In other embodiments, the confirmation authentication request may be transmitted in response to the user confirmation authentication processor 146 receiving a confirmation response including permission to share account provisioning information. In some embodiments, the confirmation authentication request may be included with or as part of the transition link.

The confirmation authentication request may include a request for authentication information that can be used by the confirmation authentication processor 146 to verify authorization of the user and/or the user device 110 to make and confirm the provisioning request. Authentication information may include an account identifier or other user identification and user authentication information. Authentication information may include an account identifier or other user identification and user authentication information. The user authentication information may include at least one authentication credential such as a password or a scanned biometric characteristic that may be used as part of a multi-factor authentication methodology. In some embodiments, an authentication credential may be or include information encrypted using an encryption key associated with the account and the account holder or the user device 110. In particular embodiments, the confirmation request may require an authentication credential that is or includes card verification information that must be obtained from a smart card 120 associated with the cardholder account.

The confirmation authentication processor 146 may be configured to receive authentication information from the user device 110 over the network 130. The confirmation authentication processor 146 may then use authentication credentials from the authentication information and information from the account information database 148 to authenticate the confirmation response. This may be accomplished using any of various known authentication processes associated with particular credentials. In embodiments where encrypted card verification information is received, the authentication processor 146 may be configured to retrieve encryption information from the account information database 148 and use it to decrypt the card-encrypted information. Successful decryption may be used as a positive indication that the provisioning requester is in possession of the transaction card 120 for the account.

It will be understood that, in embodiments having a confirmation authentication processor 146, the account provisioning data processor 145 may be configured to transmit transaction provisioning information only after the confirmation authentication processor 146 has established a positive authentication for the user, user device, and/or confirmation response.

As noted above, the administrator data processing system 140 may also include an eligibility verification processor 147 that is configured to make a determination as to whether an account is eligible for transaction provisioning. The eligibility verification data processor 147 may be a separate processor as illustrated in FIG. 6. Alternatively, the functions of the confirmation authentication processor 146 may be combined with those of the user account identification processor 143 or the session transition processor 144.

Criteria for account eligibility may be based, at least in part, on usage and history information stored in an account holder record in the account database 148. For example, information recorded in the database 148 may indicate that the account holder's address and/or mobile phone number were changed on a certain date. If statistical data suggest that fraudulent transactions are more likely with thirty days after such a change, the transaction provisioning eligibility criteria could include a requirement that no such changes have occurred within the thirty days prior to receiving a provisioning request. The eligibility verification processor 147 may be configured to retrieve account holder information from the account database 148 and compare it to the eligibility criteria.

Some eligibility criteria may be related to changes in the software or hardware used by the user device 110. This may include, for example, the occurrence of a recent SIM card replacement (i.e., a "SIM swap"). Evaluation against this type of criteria may require information from an outside source such as the telecom service provider associated with the network 130 and/or the user device 110. Accordingly, the eligibility verification processor 147 may be configured to transmit a request for information to a telecom service provider data processing system 150. The request would include information sufficient for the telecom processor 150 to identify the user and/or the user device 110, obtain device-related information from its own database 152, and transmit responsive information back to the eligibility verification processor 147. The eligibility verification processor 147 would be configured to receive this information and compare it to predetermined criteria to verify eligibility for provisioning.

The above-described eligibility checks may be conducted when the account administrator data processing system 140 receives a transition response notification from the transaction administrator processor 160. In such embodiments, the session transition processor 144 may be configured to condition the transmission of a transition link to the user device 110 on whether the eligibility verification processor 147 returns a positive eligibility verification check. In other embodiments, the eligibility checks may be conducted at the time a user account is identified based on the encrypted user datum. In such embodiments, the identification processor 143 may be configured to condition the transmission of a positive account indicator to the transaction data processing system 160 on positive eligibility verification. Alternatively, the identification processor 143 could return a positive account indicator, but with an indication that the account is currently ineligible for transaction provisioning. In still other embodiments, the eligibility checks may be carried out after receipt of a confirmation response message from the user device 110. In such embodiments, the account provisioning processor 145 may be configured to condition transmission of provisioning information to the transaction administrator data processing system 160 on a positive eligibility determination by the eligibility verification processor 146. In any of these embodiments, the eligibility verification processor 147 may be configured to transmit an ineligibility message to the user device 110 in response to a negative eligibility determination.

It will be understood that while the transaction processing system 141, datum encryption processor 142, user account identification processor 143, session transition processor 144, account provisioning processor 145, confirmation authentication processor 146, and eligibility verification processor 147 are depicted as individual systems, the functions of these system may be carried out by a single data processing system or further divided among additional data processing systems.

Figure 7:
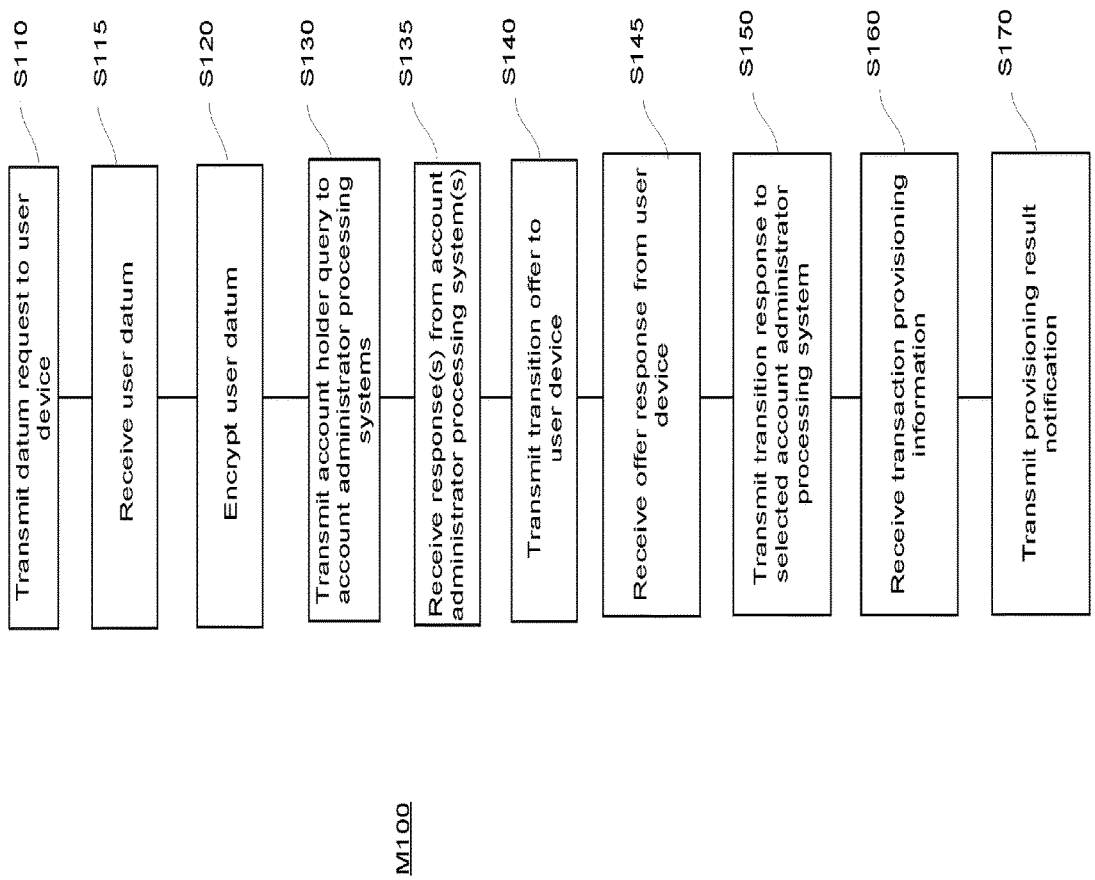
FIG. 7 is a flow diagram illustrating a method of obtaining provisioning information from one of multiple account administrator data processing systems according to an embodiment of the invention.

FIG. 7 illustrates an exemplary method M100 for requesting transaction provisioning information from one of a plurality primary account administrator systems according to an embodiment of the invention. The actions of the method M100 may typically be carried out by a transaction administrator data processing system such as any of the transaction data processing systems 160(A), 160(B), 160(C) of the system 100 depicted in FIG. 1. The actions of the method M100 may be carried out in order to facilitate or complete a transaction between the transaction data processing system and a user device of a client user. The transaction may be via interactive web communication sessions, user device applications, or through a transaction processing machine at an on-site location.

At S110 of the method M100, the transaction processor may transmit a datum request to the user device. This request may transmitted as part of an option to obtain account information from a card account or other primary account administrator. The request may be or include a request for a particular user datum that can be used to identify partner account administrators with whom the account holder has an account. The user datum may be a typical piece of account holder information that is unique to the account holder and would typically be known or available to any account administrator with whom the account holder may have an account. The account holder datum could be. for example, a telephone number, email address, driver's license number, or employee number. At S115, the transaction processing system receives the user datum from the user device of the user client. At S120, the transaction processing system uses encryption/hashing information to encrypt the user datum. The hashing information may have been previously received from an encryption generating entity, which also provided the information to partnering transaction administrator data processing systems and/or administrator data processing systems. The hashing information may be, for example, a unique algorithm and/or values usable to create a hash of a standardized format version of the user datum. As part of the action at S120, the transaction processor may put the received user datum into the standard format and encrypt it using the hashing information. At S130, the transaction processor transmits a user account query including the hashed user datum over a network to some or all of the partner administrator data processing systems with whom the hashing information was shared. At S135, the transaction processor receives, over the same network, responses from any or all of the partner administrator processing systems. In some embodiments, each response may include an indication that the account administrator associated with the responding processing system has or does not have its own account for the account holder. In other embodiments, responses are only received from administrator processing systems associated with account administrators that have accounts with the account holder. The transaction processor may determine from the query responses a subset of the partner account administrator processing systems that have accounts for the account holder.

At S140, the transaction processing system may transmit a transition offer message to the user device. The offer message may include a listing of the subset of partner account administrators that can be displayed to the account holder by the user device. The offer message may ask the account holder if the account holder wishes to transition to an application of one of the primary account administrators. At S145, the transaction processor receives a response indicating a particular administrator/application to which the account holder would like to transition. Based on this response, the transaction processor may, at S150, transmit a transition response notification to the administrator data processing system of the identified administrator entity. The transition response notification may include identification of the account holder (e.g., using the previous encrypted user datum or through unencrypted account holder information) and indicate that the account holder wishes to complete a transaction using an application associated with the identified administrator entity. The transition response notification may also include information on the transaction to be completed. If the transaction is a financial transaction, this could include, for example, an amount of a purchase to be processed using the account holder's account with the identified entity.

At S160, the transaction processor may receive transaction provisioning information from the selected administrator data processing system and, at S170, transmit back to the administrator data processing system a notification that the provisioning information was received. The transaction processor may use the provisioning information to facilitate or complete the transaction. In some embodiments, the transaction processor may store the transaction provisioning information for future transactions. In some such embodiments, retention of the provisioning information may take place only upon approval by the user client/account holder.

Figure 8:
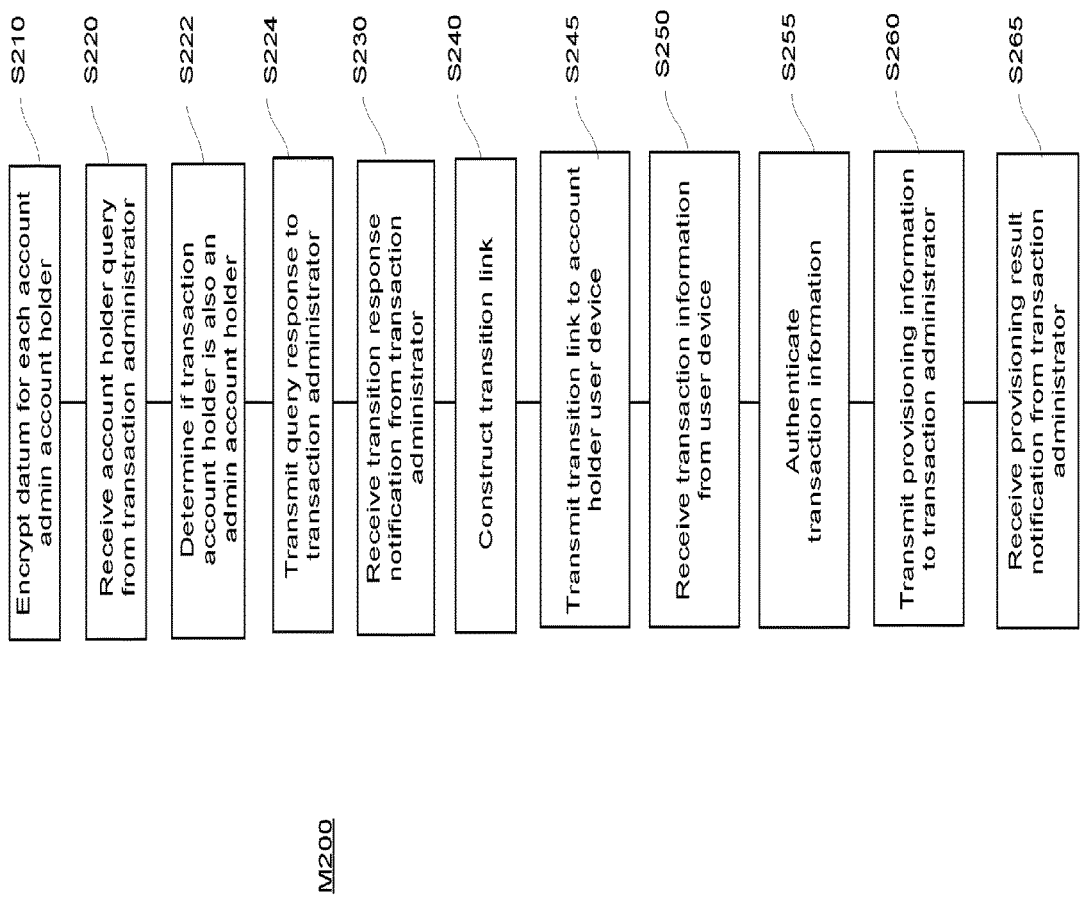
FIG. 8 is a flow diagram illustrating a method of providing provisioning information to a transaction administrator data processing systems according to an embodiment of the invention.

FIG. 8 illustrates an exemplary method M200 for providing provisioning information to multiple account processing systems according to an embodiment of the invention. The actions of the method M200 may be carried out by an account administrator data processing system such as the administrator data processing systems 140(A), 140(B), 140(C) of the system 100 depicted in FIG. 1. As in the previous method, the account administrator data processing systems may have previously received user datum encryption information that has been shared with partner transaction administrator processing systems and other primary administrator processing systems. The datum encryption information may be adapted for encrypting a particular account holder datum as described above. At S210 of method M200, the administrator data processor may use the user datum encryption information to encrypt a common user datum for some or all of its user accounts. The encrypted datum for each account may then be stored in a database in association with an account identifier and other information of the account holder of the user account.

At S220 of the method M200, the administrator data processor receives a user account query from a transaction account processing system over a network. The user account query may include an encrypted client datum associated with a client user of the transaction account processing system. At S222, the administrator processor may use the encrypted datum to determine if the client user is an account holder of an account administrator associated with the administrator data processor. This may be done by comparing the encrypted client datum with each encrypted common user datum stored in the administrators account holder database. The administrator data processor may transmit, at S224, a query response back to the transaction processor. If the administrator data processor has determined that the client user is an account holder, the query response may include a positive account holder identification notification.

At S230, the administrator data processor may receive a transition response notification from the transaction account processing system, This notification may identify the client user and may indicate that the client user wishes to transition a transaction interaction from the transaction processor to the administrator data processor. In some embodiments, the notification may also include transaction information. In response, the administrator data processor may construct, at S240, an application transition link configured to launch, on a user device of the client user, an account application associated with the user account of the client user/account holder. In some embodiments, the application transition link may also include some or all of the transaction information. The administrator data processor may obtain account holder user device information from the account holder database and, at S245, the administrator data processor may transmit over a network to the user device, a transaction processing prompt including the application transition link.

At S250, the administrator data processor may receive a transaction processing response from the user device via a communication established through the account application on the user device, This response may include an account information provisioning approval from the client user/ account holder. In response to receiving a provisioning approval from the account holder user device, the administrator data processor may retrieve account holder information for the client user/account holder from the account holder database and transmit, at S260, some or all of it as account provisioning information to the transaction account processing system. In instances where the user account is associated with a contactless transaction, the account provisioning information may include an identifier or other information associated with the contactless card for use by the account processing system (which could, for example, be associated with a merchant) to complete the transaction. At S265, the administrator data processor may receive a notification from the transaction processor indicating that it has received, and/or processed the transaction using, the transaction provisioning information.

Figure 9:
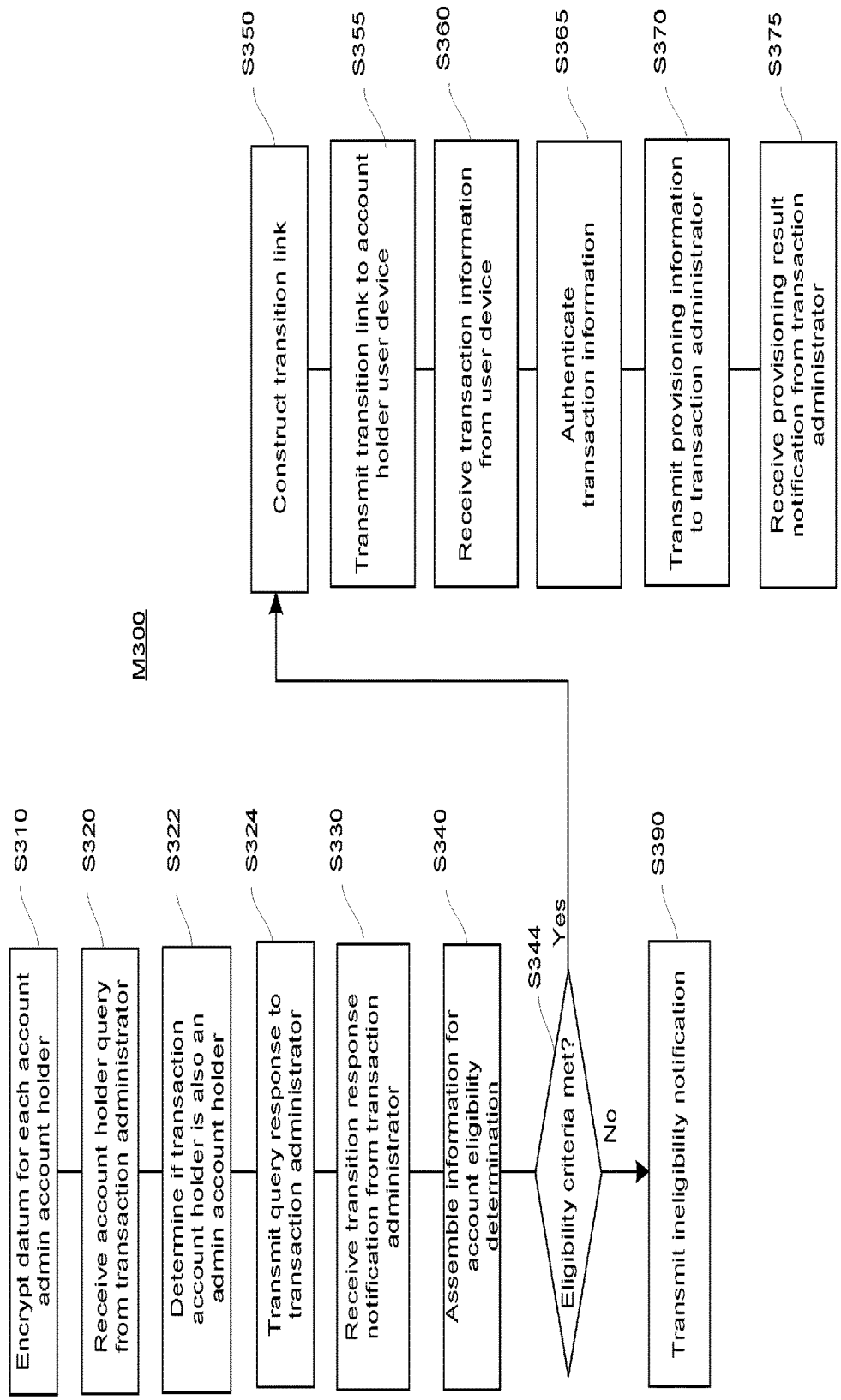
FIG. 9 is a flow diagram illustrating a method of providing provisioning information to a transaction administrator data processing systems according to an embodiment of the invention.

In some embodiments of the method M200, the action to transmit at S260 may be conditioned on authentication of the account information provisioning approval received at S250. In such embodiments, the user/user device may be required to provide authentication information usable by the administrator data processor to verify authorization of the user and/or user device to request transaction provisioning. This information may be received with or included in the transaction information at S250. At S255, the administrator data processor uses the authentication information to authenticate the transaction information, including the provisioning approval. This may include verifying that the user device is associated with the account, verifying the identity of the user as being associated with the account and is authorized to request the sharing of provisioning information, and/or verifying that the user is in possession of a card associated with the account. Verifying possession of a smart card (e.g., a contactless card) associated with the account may require information generated by the card and transmitted to the user device (e.g., by near field communication). If the authorization is confirmed, the administrator data processor may transmit the provisioning information at S290, FIG. 9 illustrates another exemplary method M300 for providing provisioning information to multiple account processing systems according to an embodiment of the invention. The actions of the method M300 may be carried out by an account administrator data processing system such as the administrator data processing systems 140(A), 140(B), 140(C) of the system 100 depicted in FIG. 1. As in the previous method, the account administrator data processing systems may have previously received user datum encryption information that has been shared with partner transaction administrator processing systems and other primary administrator processing systems. At S310 of method M300, the administrator data processor may use the user datum encryption information to encrypt a common user datum for some or all of its user accounts. At S320, the administrator data processor receives a user account query from a transaction account processing system over a network. The user account query may include an encrypted client datum associated with a client user of the transaction account processing system. At S322, the administrator processor may use the encrypted datum to determine if the client user is an account holder of an account administrator associated with the administrator data processor. This may be done by comparing the encrypted client datum with each encrypted common user datum stored in the administrators account holder database. The administrator data processor may transmit, at S324, a query response back to the transaction processor. If the administrator data processor has determined that the client user is an account holder, the query response may include a positive account holder identification notification.

At S330, the administrator data processor may receive a transition response notification from the transaction account processing system, This notification may identify the client user and may indicate that the client user wishes to transition a transaction interaction from the transaction processor to the administrator data processor. In some embodiments, the notification may also include transaction information. At S340, the administrator data processor assembles information for use in determining whether the user account meets transaction provisioning eligibility criteria. The transaction provisioning eligibility criteria may include minima, maxima, or range limits for certain account parameters that may have a correlation with fraudulent activity, For example, criteria could include a minimum time interval since establishment of the account. Some criteria may relate to transaction parameters (e.g., a maximum purchase amount). Other criteria may relate to time intervals since changes to certain parameters (e.g., address or phone number) were made. Comparison to such criteria may be referred to herein as "stability checks" as frequent changes (particularly in a mobile phone number) may be correlated to fraud potential. In instances such as these, the action of assembling information at S340 may include retrieving necessary information from the user account for comparison to the predetermined stability check criteria. In some instances, provisioning eligibility criteria may involve parameters or information not held by the account administrator. In these instances, the administrator data processor may be required to obtain information externally. In a particular example, the eligibility criteria may specify that a minimum time interval has elapsed since the SIM card was changed in the account holder's user device. In order to determine if this criterion is met, the administrator data processor may be required to obtain information from the telecommunications service provider associated with the user device. Accordingly, the action at S340 may include transmitting an information request to a telecom provider associated with the user device. The request may specify the number associated with the device and/or the identify the account holder. The request may also specify the information required (e.g., for a SIM swap check, the date of the last SIM card change). The action at S340 may also include receiving a response from the telecom service provider with the desired information.

At S344, the administrator data processor compares the assembled eligibility information to the provisioning eligibility criteria and determines whether all criteria are met. If the criteria are not me, the administrator processor may transmit an ineligibility notification to the user device, the transaction processor, or both. If the criteria are met, the administrator data processor may construct, at S350, an application transition link configured to launch, on a user device of the client user, an account application associated with the user account of the client user/account holder. In some embodiments, the application transition link may also include some or all of the transaction information. The administrator data processor may obtain account holder user device information from the account holder database and, at S355, the administrator data processor may transmit over a network to the user device, a transaction processing prompt including the application transition link.

At S360, the administrator data processor may receive a transaction processing response from the user device via a communication established through the account application on the user device, This response may include an account information provisioning approval from the client user/account holder. In response to receiving a provisioning approval from the account holder user device, the administrator data processor may retrieve account holder information for the client user/account holder from the account holder database and transmit, at S370, some or all of it as account provisioning information to the transaction account processing system. In instances where the user account is associated with a contactless transaction, the account provisioning information may include an identifier or other information associated with the contactless card for use by the account processing system (which could, for example, be associated with a merchant) to complete the transaction. At S375, the administrator data processor may receive a notification from the transaction processor indicating that it has received, and/or processed the transaction using, the transaction provisioning information.

In some embodiments of the method M300, the action to transmit at S370 may be conditioned on authentication of the account information provisioning approval received at S360. In such embodiments, the user/user device may be required to provide authentication information usable by the administrator data processor to verify authorization of the user and/or user device to request transaction provisioning. This information may be received with or included in the transaction information at S360. At S365, the administrator data processor uses the authentication information to authenticate the transaction information, including the provisioning approval. This may include verifying that the user device is associated with the account, verifying the identity of the user as being associated with the account and is authorized to request the sharing of provisioning information, and/or verifying that the user is in possession of a card associated with the account. Verifying possession of a smart card (e.g., a contactless card) associated with the account may require information generated by the card and transmitted to the user device (e.g., by near field communication). If the authorization is confirmed, the administrator data processor may transmit the provisioning information at S370, In the above-described method M300, eligibility checks are carried out after receiving a transition response notification from the transaction administrator. In some embodiments, however, the actions at S330, S340 and S344 may be carried out prior to transmitting the query response at S324. In such embodiments, the transmission of a positive account holder identification notification at S324 may be conditioned on determination of a positive eligibility determination. In some embodiments, when a negative eligibility determination is made, the query response transmitted at S324 may include an indication that the administrator has an account with the client user, but the account is not currently eligible for transaction provisioning.

Figure 10:
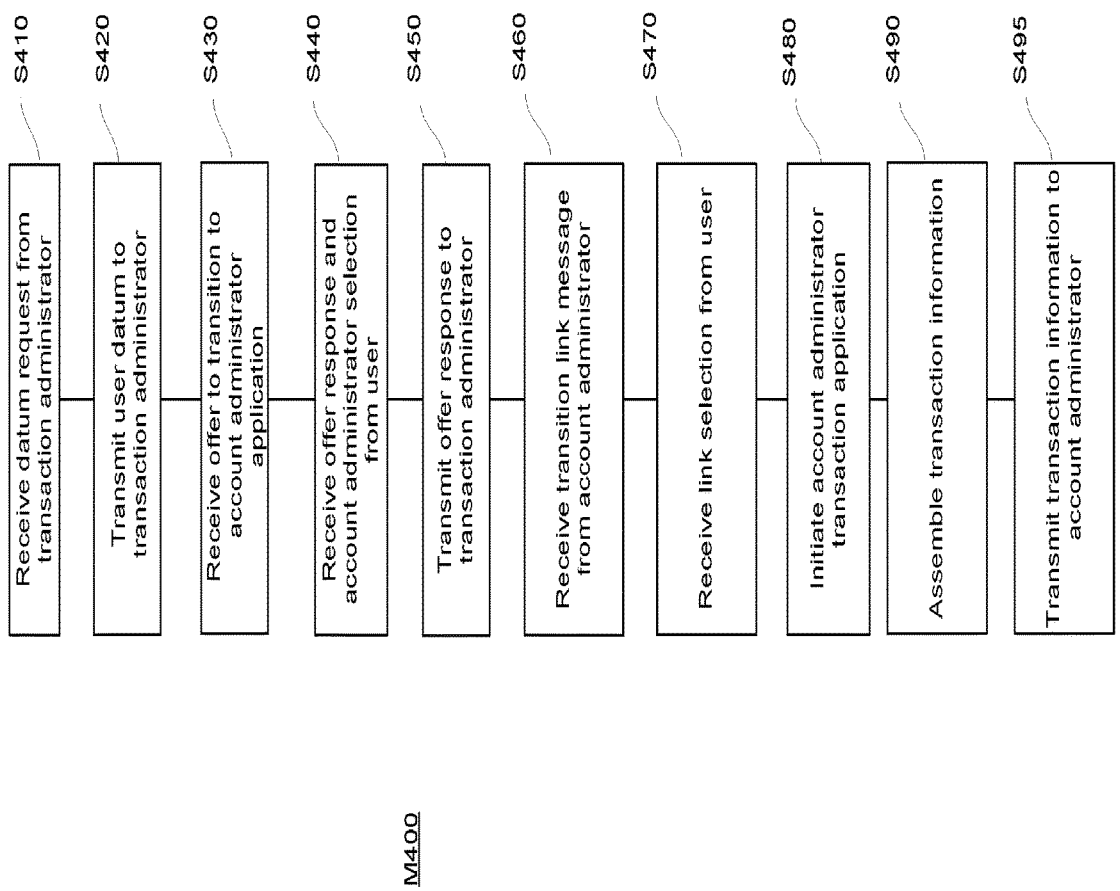
FIG. 10 is a flow diagram illustrating a method of providing authenticatable instructions to provide provisioning information to a transaction administrator data processing system to complete a transaction according to an embodiment of the invention.

FIG. 10 illustrates an exemplary method M400 for requesting that transaction provisioning information be provided to a transaction administrator data processing system. The method M400 may be carried out by a user device associated with a user and with a user account at each of one or more account administrators. The actions of the method M100 may be carried out in order to facilitate or complete a transaction between the user device and a transaction data processing system. The transaction may be via interactive web communication sessions, user device applications, or through a transaction processing machine at an on-site location. In particular embodiments, the transaction may be carried out via a transaction processing application loaded in the memory of the user device.

At S410 of the method M400, the user device may receive a user datum request from the transaction administrator data processor. The request may be or include a request for a particular user datum that can be used to by the transaction administrator data processor to identify account administrators with whom the account holder has an account. The user datum may be a typical piece of account holder information that is unique to the user and would typically be known or available to any account administrator with whom the user may have an account. The user datum could be. for example, a telephone number, email address, driver's license number, or employee number. At S420, the user device transmits the user datum to the transaction data processing system. At S430, the user device receives, from the transaction administrator data processor, a transition offer message. The offer message may include a listing of one or more primary account administrators that can be displayed to the account holder by the user device. These account administrators are identified as administrators with whom the user has an account and associated account information that can be used to facilitate the transaction between the user and the transaction administrator. The offer message instruct the user device to ask the user if the user wishes to transition to an application of one of the listed primary account administrators. At S440, the user device receives an offer response from the user which may include, if applicable, a selection of one of the primary account administrators. At S450, the user device transmits the offer response to the transaction processing system that includes identification of a particular administrator/application to which the account holder would like to transition.

At S460, the user device receives, over a network from an administrator data processor associated with the selected primary administrator, a transaction processing message including an application transition link. The application transition link may be configured to launch, on the user device, an account application associated with the selected account administrator. In some embodiments, the application transition link may also include information on the transaction being conducted between the user and the transaction administrator. At S470, the user device receives a selection of the transition link from the user via the user interface of the user device. At S480, the user device data processor launches the account application on the user device. At S490, the user device assembles transaction information for transmission to the administrator. This may include prompting the user to supply information specific to the transaction, a confirmation that the user wishes the primary administrator to send provisioning information to the transaction administrator, and/or information usable by the primary account administrator to authenticate the response and/or authorization of the user. In some embodiments in which the user's account with the primary account administrator is a smart transaction card account, the user may be required to establish communication (e.g., near field communication) between the user device and the smart transaction card. In such embodiments, the user device may receive information (e.g., card-encrypted information) from the transaction card, which can be included in the transaction information for use by the account administrator data processor for authentication, At S495, the user device may transmit to the administrator data processor via the network the transaction information, including any authentication information, as applicable.

It will be understood that some or all of the actions of any of the methods M100, M200, M300, M400 may be included as executable instructions stored in non-transitory, computer readable media.

The present invention provides automated methods by which a transaction administrator can identify primary account administrator entities with which a transacting user has a card or other primary account. This is accomplished through the use of a shared encryption/hashing algorithm and/or unique encryption keys, which allows the primary account administrators to receive and compare a hashed user datum to similarly hashed user datums for their account holders to determine if a particular user is one an account holder. Neither the transaction administrator nor the account administrators is required to share usable account information to make the determination. This establishes the basis for secure transmission of primary account provisioning information for a particular primary account holder from the primary account administrator to those partner entities also having an account for that primary account holder. This greatly improves the security and efficiency of the sharing operation as well as the convenience to the account holder. The methods of the invention also enable a user to have account provisioning information securely pushed to a transaction administrator for use in completing a transaction without the user themselves being required to present potentially sensitive account information. The methods of the invention allow the account holder's user device to transition a transaction session seamlessly and securely from an application of the transaction administrator to an application of the account administrator, and, using that application, provide authenticatable instructions to the account administrator to send provisioning information to the transaction administrator. Once the instructions are authenticated, the account administrator can securely push account provisioning information and user data to the transaction processing entity without further action by the account holder.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A system, comprising:
an account administrator processor, wherein the account administrator processor is configured to:
receive one or more account provisioning information from at least one of a plurality of account processing systems;
store the one or more account provisioning information in a data storage unit;
receive, from a transaction processor, a user account query, wherein the user account query comprises an encrypted client datum;
determine whether the encrypted client datum is associated with any of the account provisioning information, wherein the determination comprises
comparing the encrypted client datum to one or more stored client datum;
transmit, to the transaction processor, a positive account holder identification notification;
carry out at least one service eligibility check to determine a positive or negative provisioning service eligibility for a user account;
construct an application transition link configured to launch, on a user device, an account application associated with the user account of an account holder;
transmit to the user device, a transaction processing prompt including the application transition link;
receive, from the user device, a transaction processing response comprising approval for account information provisioning;
retrieve, from the data storage unit, the one or more account provisioning information; and
transmit, to the transaction processor, the one or more account provisioning information,
wherein the actions of constructing an application link, transmitting the transaction processing prompt, retrieving the one or more account provisioning information, and transmitting the one or more account provisioning information are carried out only after a positive service eligibility is determined for the user account.

2. The system of claim 1, wherein the account administrator processor is further configured to:
transmit, to the user device, an authentication request; and
receive, from the user device, an authentication credential.

3. The system of claim 2, wherein the authentication credential includes encrypted information received by the user device from a contactless card associated with the user account.

4. The system of claim 2, wherein the authentication credential includes multi-factor information associated with the user account.

5. The system of claim 1, wherein the client datum is at least one selected from the group of a phone number and an email address.

6. The system of claim 1, wherein
the at least one of a plurality of account processing system is associated with a merchant,
the user account is a contactless card account, and
the account provisioning information includes contactless card account information for use in carrying out account holder transactions processed by the at least one of a plurality of account processing system.

7. The system of claim 1, wherein the account administrator processor is further configured to request permission from the at least one of a plurality of processing systems to store the provisioning information for use in future transactions.

8. The system of claim 1, wherein the at least one service eligibility check includes at least one selected from the group of a mobile number stability check and a SIM swap check.

9. The system of claim 8, wherein:
the at least one service eligibility check comprises the mobile number stability check, and
the account administrator processor is further configured to request in connection with the mobile number stability check, from a telecommunications provider, a time interval since a change to the mobile number.

10. A method for providing account provisioning information to a transaction account processing system, the method comprising:
receiving, by an account administrator processor, one or more account provisioning information from at least one of a plurality of account processing systems;
storing, by the account administrator processor, the one or more account provisioning information in a data storage unit;
receiving, by the account administrator processor from a transaction processor, a user account query, wherein the user account query comprises an encrypted client datum;
determining, by the account administrator processor, whether the encrypted client datum is associated with any of the account provisioning information, wherein the determination comprises comparing the encrypted client datum to one or more stored client datum;
transmitting, by the account administrator processor to the transaction processor, a positive account holder identification notification;
carrying out, by the account administrator processor, at least one service eligibility check to determine a positive or negative provisioning service eligibility for a user account;
constructing, by the account administrator processor, an application transition link configured to launch, on a user device, an account application associated with the user account of an account holder;
transmitting, by the account administrator processor to the user device, a transaction processing prompt including the application transition link;
receiving, by the account administrator processor from the user device, a transaction processing response comprising approval for account information provisioning;
retrieving, by the account administrator processor from the data storage unit, the one or more account provisioning information; and
transmitting, by the account administrator processor to the transaction processor, the one or more account provisioning information,
wherein the actions of constructing an application link, transmitting the transaction processing prompt, retrieving the one or more account provisioning information, and transmitting the one or more account provisioning information are carried out only after a positive service eligibility is determined for the user account.

11. The method of claim 10, wherein the client datum is at least one selected from the group of a phone number and an email address.

12. The method of claim 10, wherein:
the account processing system is associated with a merchant,
the user account is a contactless card account, and
the account provisioning information includes contactless card account information for use by the account processing system to complete the transaction.

13. The method of claim 10, wherein:
transmitting, by the account administrator processor to the user device, a confirmation authentication request;
receiving, by the account administrator processor from the user device, at least one authentication credential; and
authenticating the transaction processing response by the account administrator processor using the at least one authentication credential and a predetermined authentication process,
wherein the action of transmitting account provisioning information is carried out only after a positive authentication of the confirmation authentication request.

14. The method of claim 13, wherein the at least one authentication credential includes encrypted information received by the user device from a contactless card associated with the user account.

15. The method of claim 13, wherein the at least one authentication credential includes multi-factor information associated with the user account.

16. The method of claim 10, wherein the account administrator processor is further configured to request permission for the account processing system to store the provisioning information for use in future transactions.

17. The method of claim 10, wherein the client datum is a mobile network number associated with the user device and the at least one service eligibility check includes at least one selected from the group of a mobile number stability check and a SIM swap check.

18. The method of claim 17, wherein:
the at least one service eligibility check comprises the SIM swap check, and
the account administrator processor is further configured to request in connection with the SIM swap check, from a telecommunications provider, a time interval since a SIM card replacement.

19. A non-transitory computer readable medium comprising instructions that, when executed on a data processing system, cause the data processing system to perform actions comprising:
receiving one or more account provisioning information from at least one of a plurality of account processing systems;
storing the one or more account provisioning information in a data storage unit;

receiving, from a transaction processor, a user account query, wherein the user account query comprises an encrypted client datum;

determining whether the encrypted client datum is associated with any of the account provisioning information, wherein the determination comprises comparing the encrypted client datum to one or more stored client datum;

transmitting, to the transaction processor, a positive account holder identification notification;

carrying out, by the account administrator processor, at least one service eligibility check to determine a positive or negative provisioning service eligibility for the user account;

constructing, by the account administrator processor, an application transition link configured to launch, on a user device, an account application associated with a user account of an account holder;

transmitting, by the account administrator processor to the user device, a transaction processing prompt including the application transition link;

receiving, from the user device, a transaction processing response comprising approval for account information provisioning;

retrieving, from the data storage unit, the one or more account provisioning information; and transmitting, to the transaction processor, the one or more account provisioning information, wherein the actions of constructing an application link, transmitting the transaction processing prompt, retrieving the one or more account provisioning information, and transmitting the one or more account provisioning information are carried out only after a positive service eligibility is determined for the user account.

20. The non-transitory computer readable medium according to claim 19 further comprising instructions that, when executed on a data processing system, perform actions comprising:

transmitting, to the user device, a confirmation authentication request;

receiving, from the user device, at least one authentication credential; and authenticating the transaction processing response using the at least one authentication credential and a predetermined authentication process, wherein the action of transmitting account provisioning information is carried out only after a positive authentication of the confirmation response.

* * * * *